(12) United States Patent
Chang (10) Patent No.: US 8,206,801 B2
(45) Date of Patent: Jun. 26, 2012

(54) BUFFER BOARD FOR TREADMILL

(76) Inventor: Huang-Tung Chang, Hemei Township, Changhua County (TW)

(*) Notice: Subject to any disclaimer, the term of this patent is extended or adjusted under 35 U.S.C. 154(b) by 195 days.

(21) Appl. No.: 12/751,100

(22) Filed: Mar. 31, 2010

(65) Prior Publication Data
US 2011/0111166 A1 May 12, 2011

Related U.S. Application Data

(63) Continuation-in-part of application No. 12/614,081, filed on Nov. 6, 2009, now abandoned.

(51) Int. Cl.
*A63B 22/02* (2006.01)
(52) U.S. Cl. ........... 428/56; 428/54; 428/106; 428/107; 442/186; 442/239; 482/54
(58) Field of Classification Search ............. 428/54–56, 428/106, 109, 110, 111, 107; 442/185, 186, 442/203, 221, 224, 239; 482/54
See application file for complete search history.

(56) References Cited

U.S. PATENT DOCUMENTS

| 4,810,551 A * | 3/1989 | Chu ............................... 428/106 |
| 7,647,957 B2 * | 1/2010 | Pasha et al. .................... 144/332 |

* cited by examiner

*Primary Examiner* — Alexander Thomas
(74) *Attorney, Agent, or Firm* — Jackson IPG PLLC; Demian K. Jackson (57) ABSTRACT

A buffer board for a treadmill includes a bamboo strip portion and an endurable slide plate. The bamboo strip portion is composed of at least one longitudinal bamboo strip and at least one transverse bamboo strip. The longitudinal bamboo strip and the transverse bamboo strip are crosswise knitted to constitute a woven bamboo plate. The woven bamboo plate can be stacked one by one to constitute a stack of woven bamboo plates in a desired thickness for enhancing the strength of the buffer board. The longitudinal bamboo strips connected side by side and the transverse bamboo strips connected side by side are stacked up to constitute a laminated bamboo board. The upper woven bamboo plate or the laminated bamboo board is attached with the endurable slide board. After being applied with a press force, the surface of the endurable slide board is formed with concave-convex massage pattern according to the pattern of the woven bamboo plate or the laminated bamboo board. The buffer board constituted by the woven bamboo plate or the laminated bamboo board or both provides a better buffer effect and a foot massage effect.

10 Claims, 11 Drawing Sheets

BUFFER BOARD FOR TREADMILL

CROSS-REFERENCE TO RELATED APPLICATIONS

This application is a continuation-in-part of U.S. application Ser. No. 12/614,081, filed Nov. 6, 2009, now abandoned.

BACKGROUND OF THE INVENTION

1. Field of the Invention

The present invention relates to a buffer board, and more particularly to a buffer board for a treadmill. The buffer board uses bamboo strips to be crosswise knitted to constitute a woven bamboo plate, or uses longitudinal bamboo strips connected side by side and transverse bamboo strips connected side by side to constitute a laminated bamboo board, or uses the woven bamboo plate and the laminated bamboo board to be stacked each other. The upper woven bamboo plate or the laminated bamboo board is attached with an endurable slide board. After being applied with a press force, the surface of the endurable slide board is formed with concave-convex massage pattern. The buffer board enhances a buffer effect and provides a foot massage effect.

2. Description of the Prior Art

In general, a conventional treadmill has a buffer board located under a running belt as a support. When the user treads on the running belt, the buffer board bears great applied force. If there is no buffer resilience, the user will feel unconformable. Therefore, an improved treadmill is provided with buffer pads and a buffer device under the buffer board. Besides, a layer of foam is attached on the buffer board and a layer of woven fabric is attached on the layer of foam, providing a smooth turning for a running loop and a comfortable buffer.

The restoration effect of the conventional treadmill is not good, its hardness is great, and the deformation capacity of tread is less. The foot joints of the user may be injured easily when running.

The buffer board of the conventional treadmill is made of hard material, relying on its resilient material, and the buffer pads at four corners of the treadmill are not enough. Therefore, the buffer device is adapted to assist the buffer effect. However, this structure is complicated and the cost is high.

SUMMARY OF THE INVENTION

According to a first aspect of the present invention, there is provided a buffer board for a treadmill. The buffer board is mounted under a running belt of the treadmill. The buffer board comprises a bamboo strip portion and an endurable slide plate. The bamboo strip portion is composed of a longitudinal bamboo strip and a transverse bamboo strip. The longitudinal bamboo strip and the transverse bamboo strip are crosswise knitted to constitute a woven bamboo plate. The endurable slide plate is attached on the woven bamboo plate.

According to a second aspect of the present invention, there is provided a buffer board for a treadmill. The buffer board is mounted under a running belt of the treadmill. The buffer board comprises a bamboo strip portion and an endurable slide plate. The bamboo strip portion is composed of longitudinal bamboo strips which are connected side by side and transverse bamboo strips which are connected side by side. The longitudinal bamboo strips and the transverse bamboo strips are stacked to constitute a laminated bamboo board. The endurable slide plate is attached on the laminated bamboo board.

According to a third aspect of the present invention, there is provided a buffer board for a treadmill. The buffer board is mounted under a running belt of the treadmill, and comprises a woven bamboo plate, a laminated bamboo board and an endurable slide board. The woven bamboo plate is composed of a longitudinal bamboo strip and a transverse bamboo strip. The longitudinal bamboo strip and the transverse bamboo strip are crosswise knitted. The woven bamboo plate is attached to the laminated bamboo board. The laminated bamboo board comprises a plurality of longitudinal bamboo strips which are connected side by side and a plurality of transverse bamboo strips which are connected side by side. The laminated bamboo board is attached to the woven bamboo plate. The endurable slide board is attached on the woven bamboo plate.

Preferably, the numbers of the longitudinal strip and the transverse strip depend on the weight and the area of a load.

Preferably, the woven bamboo plate is constituted by one longitudinal bamboo strip and one transverse bamboo strip which are crosswise knitted.

Preferably, the woven bamboo plate is constituted by two longitudinal bamboo strips and two transverse bamboo strips which are crosswise knitted.

Preferably, the woven bamboo plate is constituted by three longitudinal bamboo strips and three transverse bamboo strips which are crosswise knitted.

Preferably, the woven bamboo plate is stacked with at least another woven bamboo plate to constitute a stack of woven bamboo plates.

Preferably, the laminated bamboo board is stacked with at least another laminated bamboo board to constitute a composite laminated bamboo board.

Preferably, the woven bamboo plate and the laminated bamboo board are stacked and then attached with the endurable slide board 2.

Preferably, the endurable slide board on the buffer board is applied with a press force P, such that the surface of the endurable slide board is formed with concave-convex massage pattern according to the pattern of the woven bamboo plate or the laminated bamboo board.

Compared to the prior art, the buffer board of the present invention uses the bamboo plate or the laminated bamboo board or both which are then attached with the endurable slide board to provide a better buffer effect and a foot massage effect.

DETAILED DESCRIPTION OF THE PREFERRED EMBODIMENTS

Embodiments of the present invention will now be described, by way of example only, with reference to the accompanying drawings.

Figure 1A:
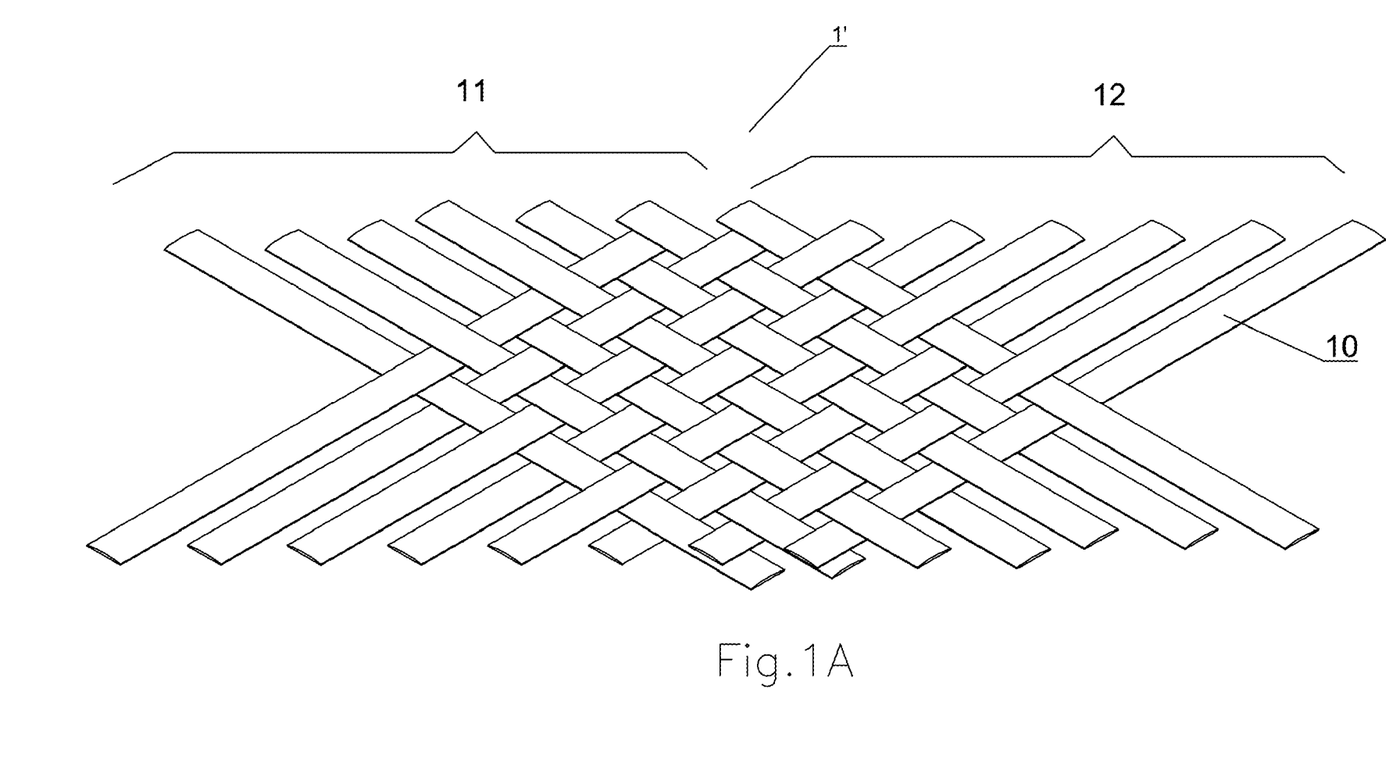
FIG. 1A is a perspective view of a woven bamboo plate according to a first embodiment of the present invention.
Figure 1B:
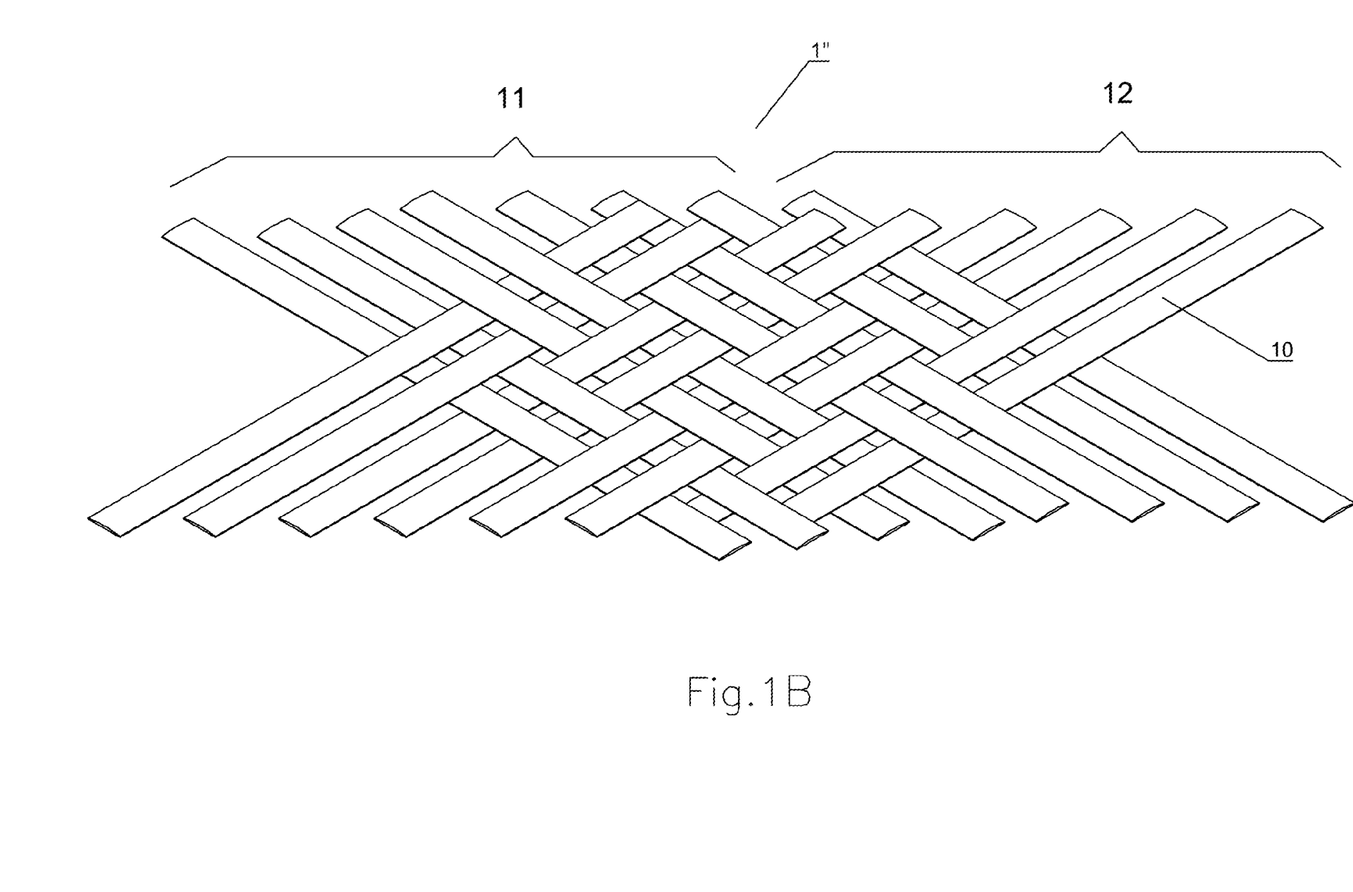
FIG. 1B is a perspective view of a woven bamboo plate according to a second embodiment of the present invention.
Figure 1C:
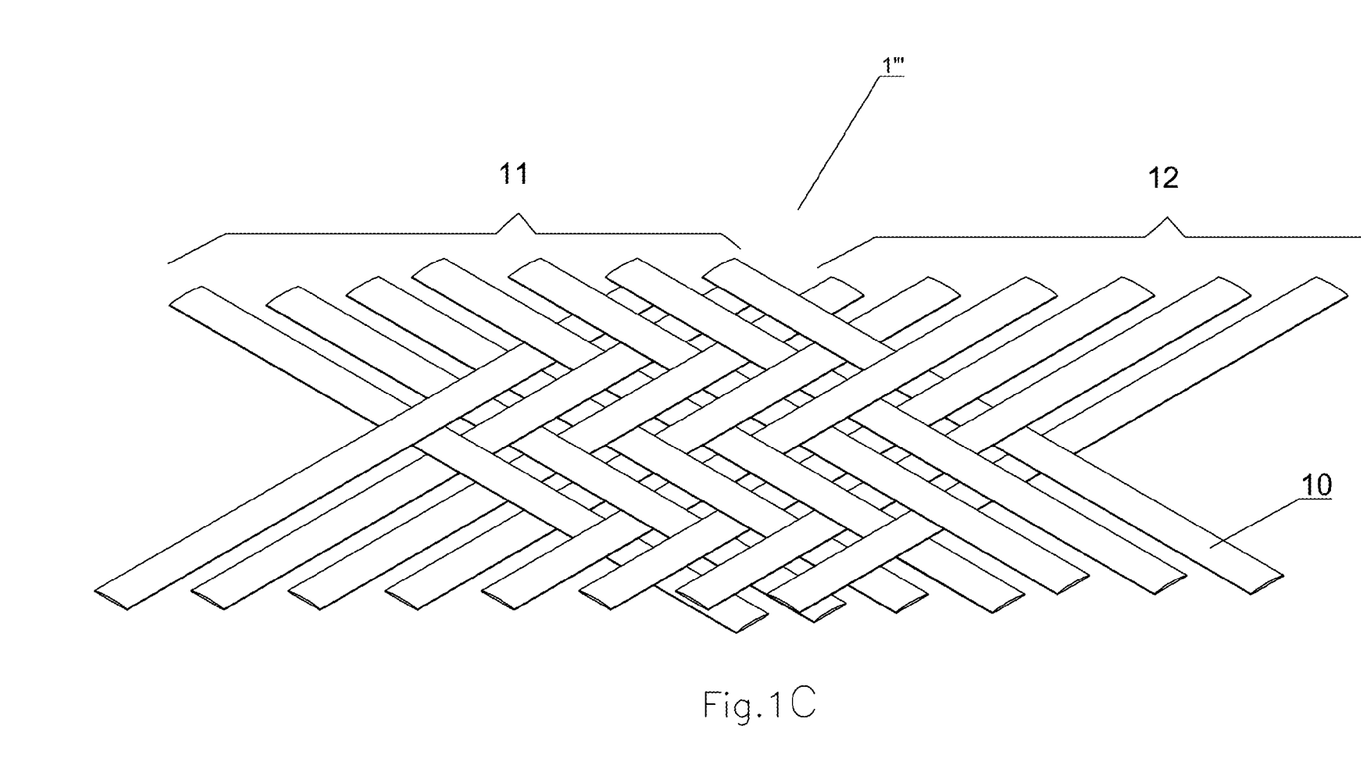
FIG. 1C is a perspective view of a woven bamboo plate according to a third embodiment of the present invention.
Figure 3:
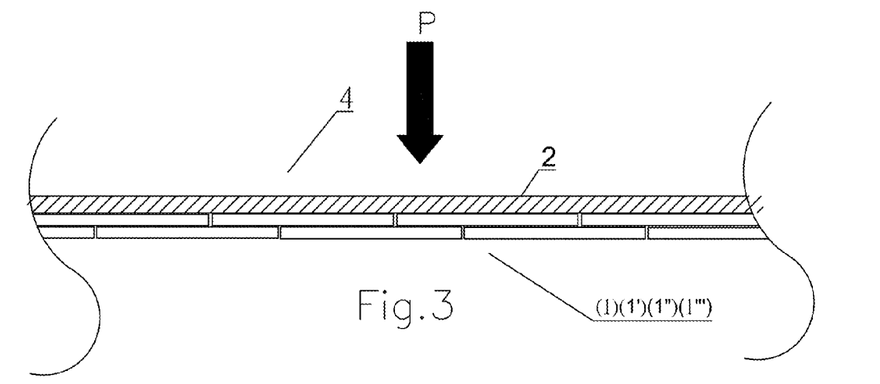
FIG. 3 is a schematic view showing a buffer board which is constituted by at least one layer of woven bamboo plate.
Figure 3A:
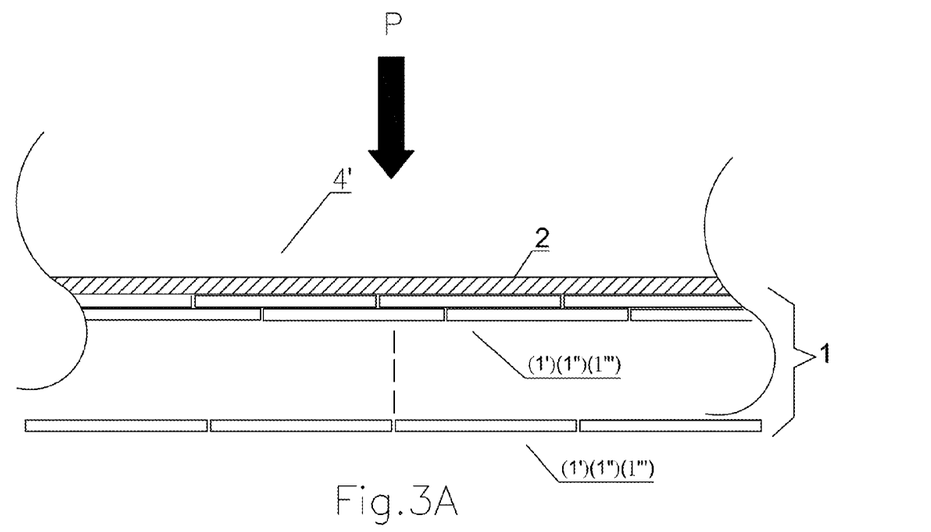
FIG. 3A is a cross-sectional view of a buffer board which is constituted by at least one layer of woven bamboo plate.

As shown in FIGS. 1A, 1B and 1C, the present invention uses bamboo strips 10 to constitute a bamboo plate 1', 1", 1'". The bamboo strips 10 includes at least one longitudinal bamboo strip 11 and at least one transverse bamboo strip 12 which are crosswise knitted with each other. The bamboo plate 1', 1", 1'" is attached with an endurable slide plate 2 to constitute a buffer board 4, as shown in FIG. 3 and FIG. 3A. The bamboo plate 1', 1", 1'" has resilience and a better restoration character as the buffer board 4 for a running belt 51 of a treadmill 5 so that the user can run comfortably.

Referring to FIGS. 1A, 1B and 1C, the numbers of the longitudinal bamboo strip 11 and the transverse bamboo strip 12 depend on the weight of a desired load so as to provide an appropriate buffer effect.

Referring to FIG. 1A, the bamboo plate 1' is crosswise knitted by one longitudinal bamboo strip 11 and one transverse bamboo strip 12.

Referring to FIG. 1B, the bamboo plate 1" is crosswise knitted by two longitudinal bamboo strips 11 and two transverse bamboo strips 12.

Referring to FIG. 1C, the bamboo plate 1'" is crosswise knitted by three longitudinal bamboo strips 11 and three transverse bamboo strips 12.

Accordingly, the required numbers of the longitudinal bamboo strips 11 and the transverse bamboo strips 12 are analogized by the desired buffer effect. No matter what type of bamboo plate 1', 1", 1'" is generally called a woven bamboo plate 1. Therefore, the at least one longitudinal bamboo strip 11 and the at least one transverse bamboo strip 12 are able to disperse tread impact, providing a balance buffer effect.

Figure 2:
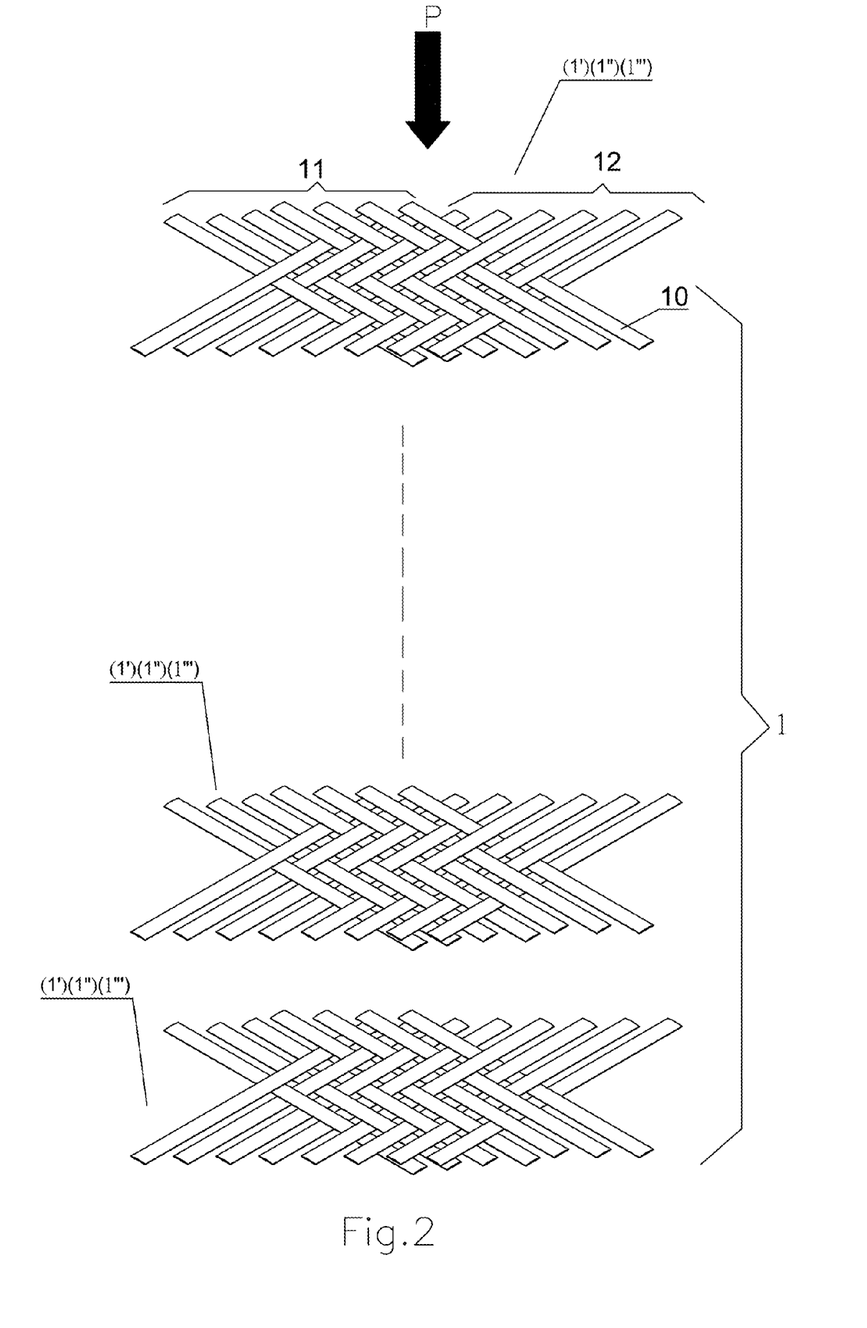
FIG. 2 is a schematic view showing a stack of woven bamboo plates which are stacked and bound together.

Referring to FIGS. 2, 3, and 3A, the woven bamboo plate 1 in a stack according to the woven bamboo plate 1', 1", 1'" of the aforesaid embodiments can be constituted by at least one layer of the woven bamboo plate 1', 1", 1'" depending on a desired thickness and strength, and then attached with the endurable slide plate 2 so as to strengthen the buffer board 4, 4' and maintain its resilience.

FIG. 3 and FIG. 3A show a second embodiment of the buffer board 4'. The endurable slide plate 2 is attached on the woven bamboo plate 1', 1", 1'" or the woven bamboo plate 1 in a stack.

Figure 4:
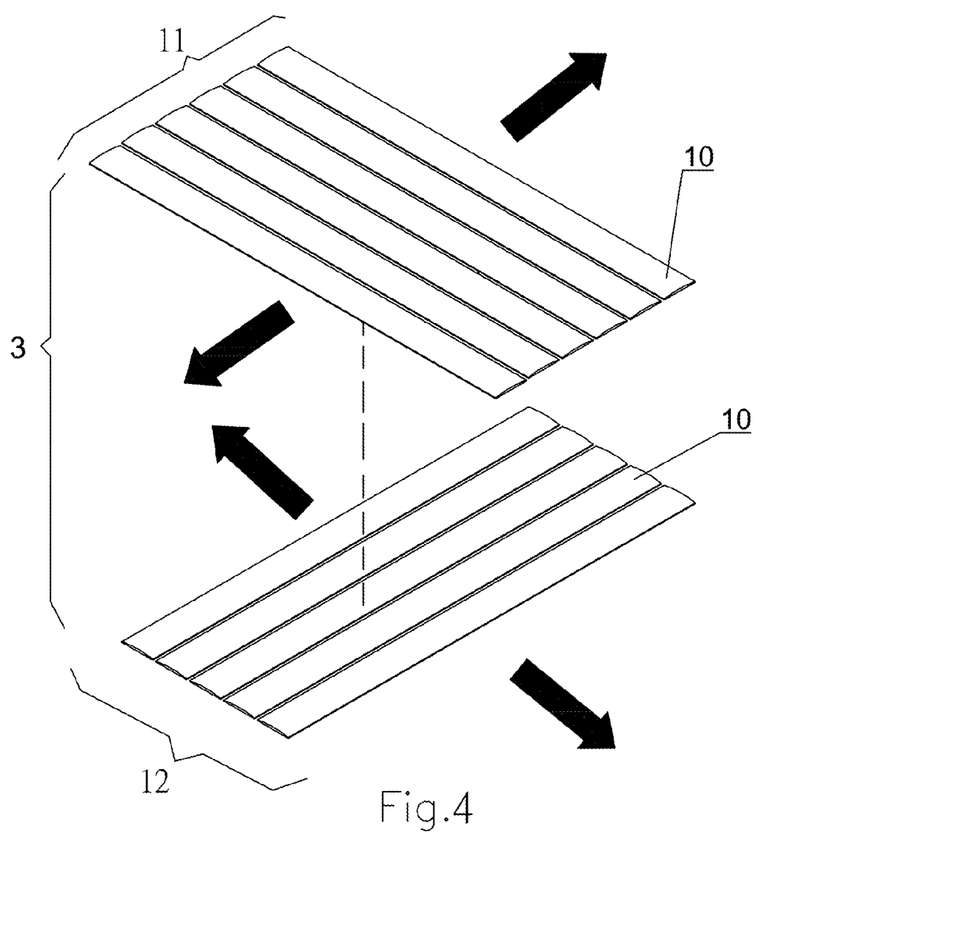
FIG. 4 is an exploded view of a laminated bamboo board according to another embodiment of the present invention.
Figure 4A:
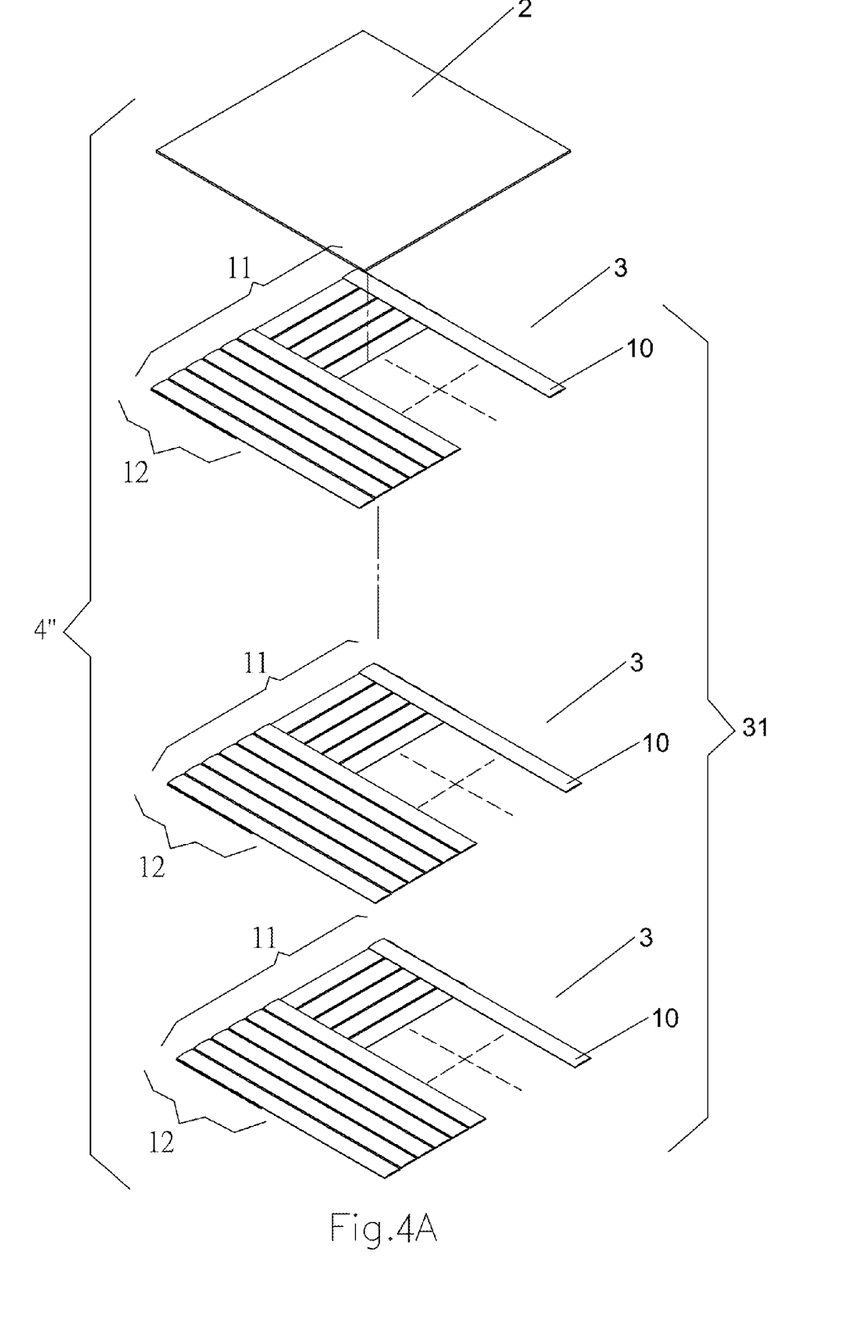
FIG. 4A is a schematic view showing a buffer board which is constituted by at least one layer of laminated bamboo board.

Referring to FIG. 4 and FIG. 4A, the bamboo strips 10 comprises a number of longitudinal bamboo strips 11 or transverse bamboo strips 12 which are connected side by side. The bamboo strips 10 are stacked one by one to constitute a laminated bamboo board 3. The laminated bamboo board 3 is attached with the endurable slide board 2 to constitute a buffer board 4".

Referring to FIG. 4, the laminated bamboo board 3 comprises the longitudinal bamboo strips 11 which are connected side by side and the transverse bamboo strips 12 which are connected side by side.

Referring to FIG. 4A, a composite laminated bamboo board 31 comprises more than one layer of the laminated bamboo board 3.

Figure 4B:
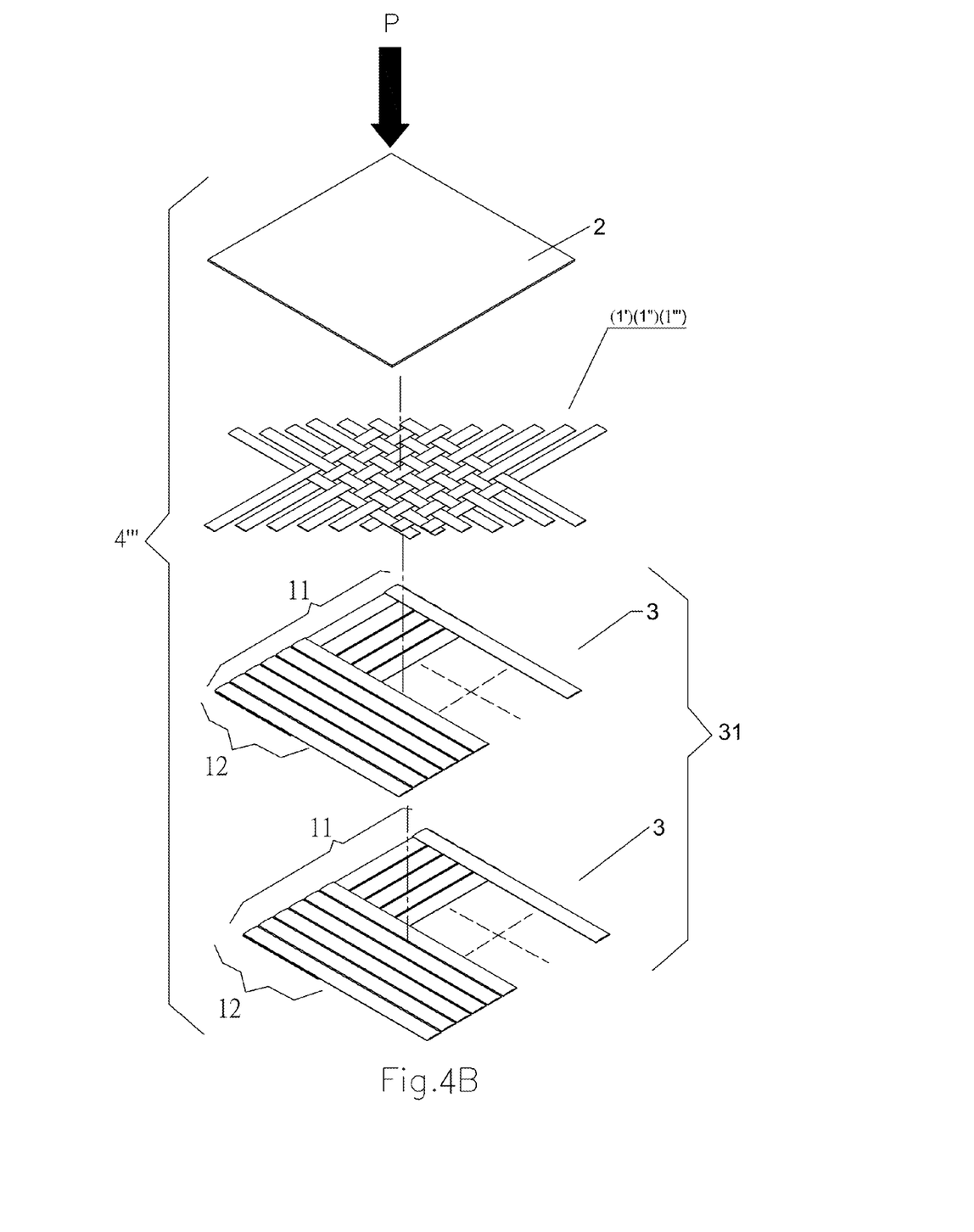
FIG. 4B is a schematic view showing a buffer board which is constituted by at least one layer of laminated bamboo board and at least one layer of woven bamboo plate.
Figure 4C:
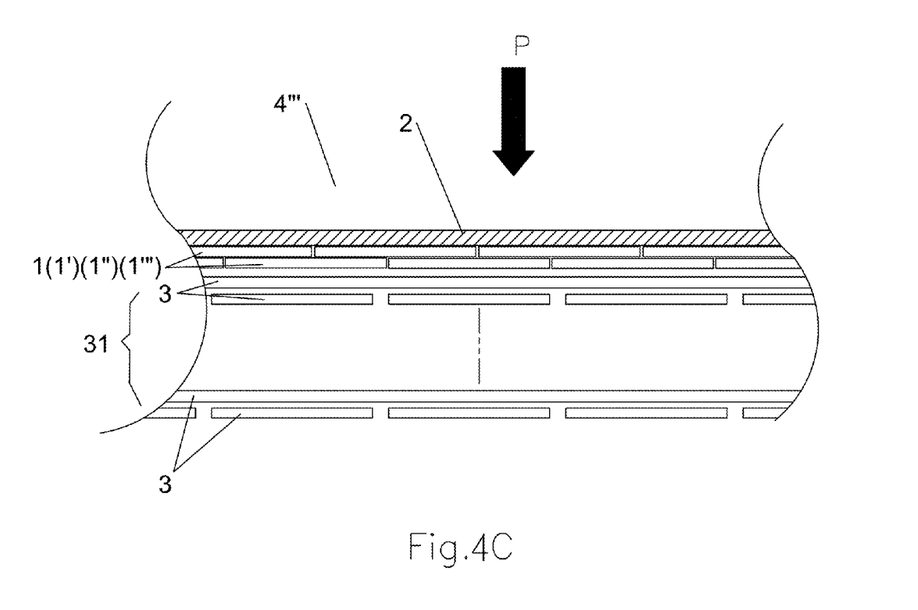
FIG. 4C is a cross-sectional view showing a buffer board which is constituted by at least one layer of laminated bamboo board and at least one layer of woven bamboo plate.

Referring to FIG. 4B and FIG. 4.C, a buffer board 4'" comprises at least one layer of woven bamboo plate 1', 1", 1'", at least one layer of laminated bamboo board 3 and the endurable slide board 2 which are stacked one by one.

Referring to FIG. 4A, FIG. 4B and FIG. 4C, the endurable slide board 2 on the buffer board 4, 4', 4", 4'" can be applied with a press force P, such that the surface of the endurable slide board 2 is formed with concave-convex massage pattern according to the pattern of the woven bamboo plate 1', 1", 1'" or the laminated bamboo board 3.

Figure 5:
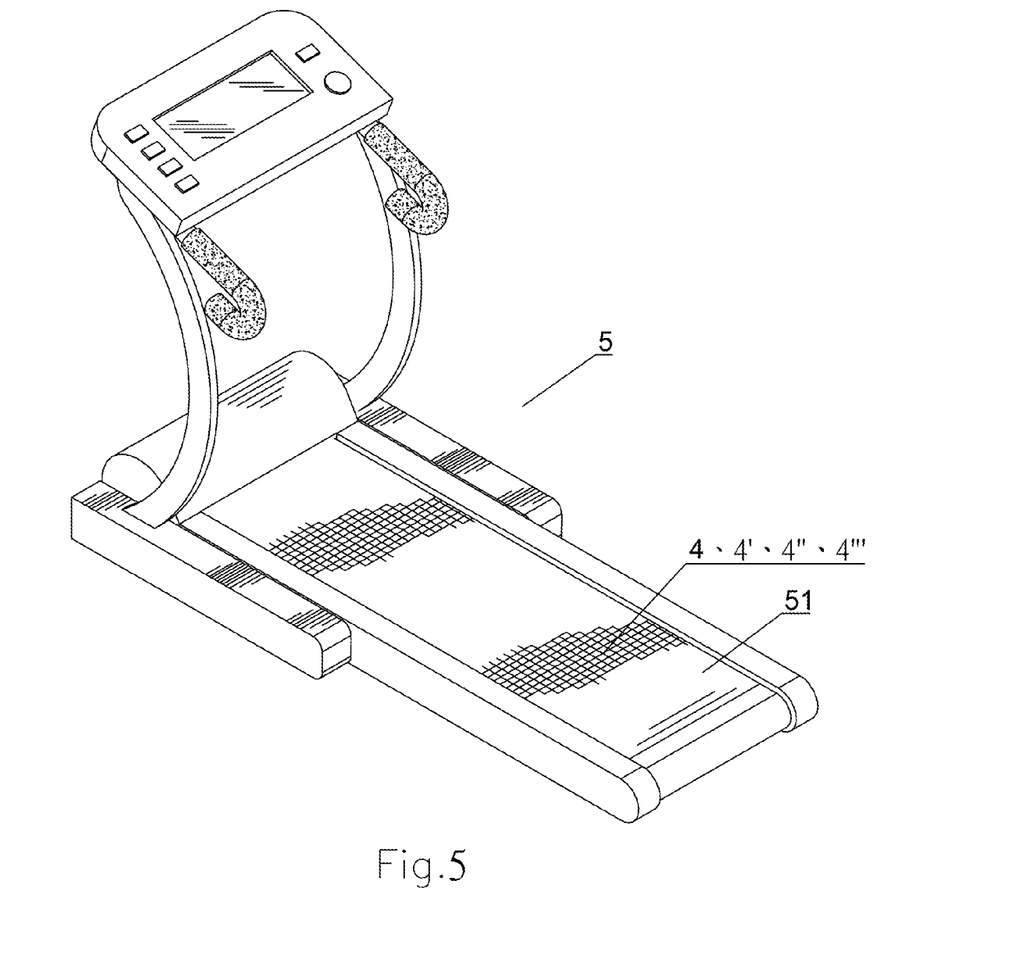
FIG. 5 is a perspective view showing the present invention applied to a treadmill.
Figure 5A:
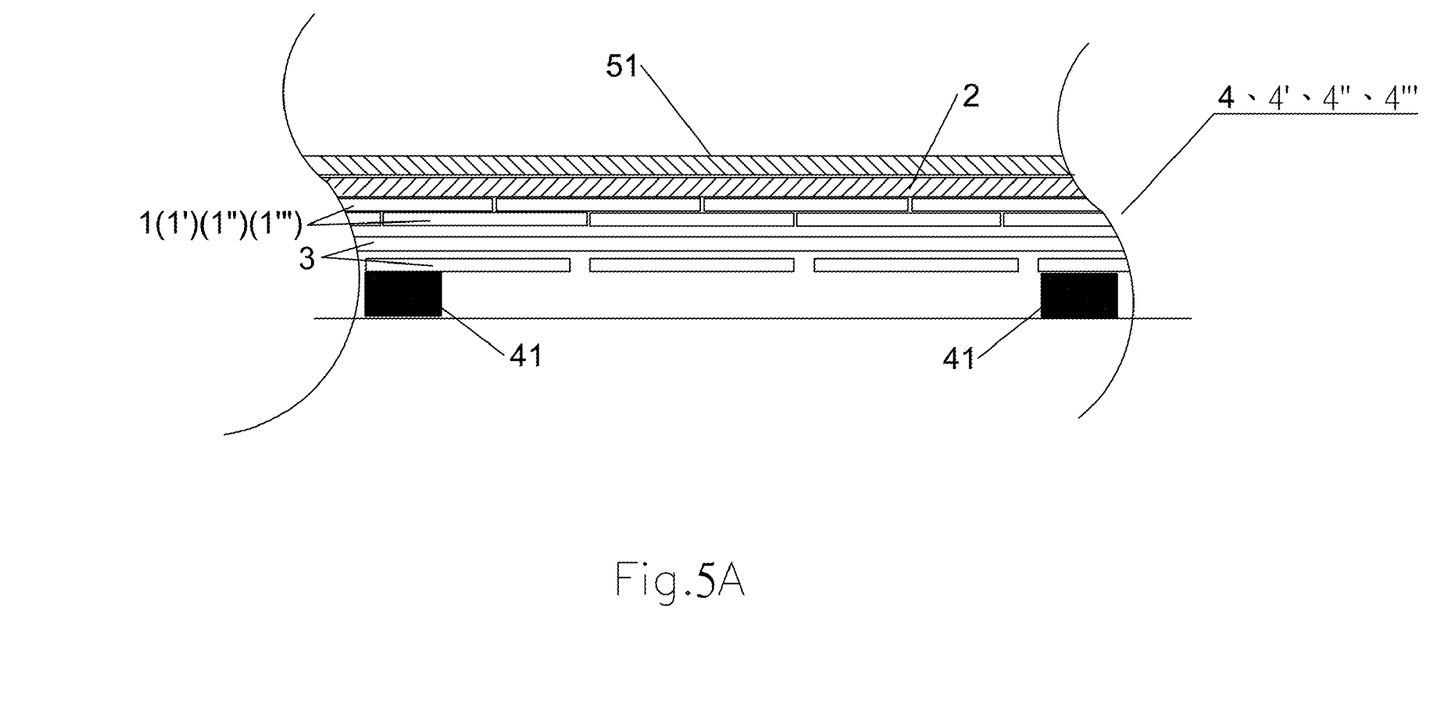
FIG. 5A is a cross-sectional view showing a further embodiment of the present invention.

Referring to FIG. 5 and FIG. 5A, the buffer board 4, 4', 4", 4'" is disposed under the running belt 51 of the treadmill 5. The woven bamboo plate 1', 1", 1'" or the stack of woven bamboo plates 1, the laminated bamboo board 3 or the composite laminated bamboo board 31 is disposed on a plurality of buffer pads 41 to provide a better resilience and a better buffer effect, so that the user can tread on the running belt 51 comfortably. Besides, the concave-convex massage pattern can massage the foot of the user.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A buffer board mounted under a running belt of a treadmill, the buffer board comprising a bamboo strip portion and an endurable slide plate, the bamboo strip portion comprising a plurality of longitudinal bamboo strips and a plurality of transverse bamboo strips, wherein the longitudinal bamboo strips and the transverse bamboo strips are interwoven so as to constitute a woven bamboo plate, the endurable slide plate being attached on the woven bamboo plate.

2. The buffer board as claimed in claim 1, wherein the woven bamboo plate is interwoven by two longitudinal bamboo strips and two transverse bamboo strips.

3. The buffer board as claimed in claim 1, wherein the woven bamboo plate is interwoven by three longitudinal bamboo strips and three transverse bamboo strips.

4. The buffer board as claimed in claim 1, wherein the woven bamboo plate is stacked with at least another woven bamboo plate to constitute a stack of woven bamboo plates.

5. A buffer board mounted under a running belt of a treadmill, the buffer board comprising a bamboo strip portion and an endurable slide plate, the bamboo strip portion comprising a plurality of longitudinal bamboo strips which are connected side by side and a plurality of transverse bamboo strips which are connected side by side, the longitudinal bamboo strips and the transverse bamboo strips being stacked to constitute a laminated bamboo board, the endurable slide plate being attached on the laminated bamboo board.

6. The buffer board as claimed in claim 5, wherein the laminated bamboo board is stacked with at least another laminated bamboo board to constitute a composite laminated bamboo board.

7. A buffer board mounted under a running belt of a treadmill, the buffer board comprising:
- a woven bamboo plate comprising a plurality of longitudinal bamboo strips and a plurality of transverse bamboo strips, wherein the longitudinal bamboo strips and the transverse bamboo strips are interwoven;
- a laminated bamboo board comprising a plurality of longitudinal bamboo strips which are connected side by side and a plurality of transverse bamboo strips which are connected side by side, the laminated bamboo board being attached to the woven bamboo plate; and
- an endurable slide board attached on the woven bamboo plate.

8. The buffer board as claimed in claim 7, wherein the woven bamboo plate is interwoven by two longitudinal bamboo strips and two transverse bamboo strips.

9. The buffer board as claimed in claim 7, wherein the woven bamboo plate is interwoven by three longitudinal bamboo strips and three transverse bamboo strips.

10. The buffer board as claimed in claim 7, wherein the laminated bamboo board is stacked with at least another laminated bamboo board to constitute a composite laminated bamboo board.

* * * * *